H. C. WAITE.
TRACTOR STEERING GEAR.
APPLICATION FILED FEB. 23, 1915.
1,198,088.
Patented Sept. 12, 1916.
2 SHEETS—SHEET 1.
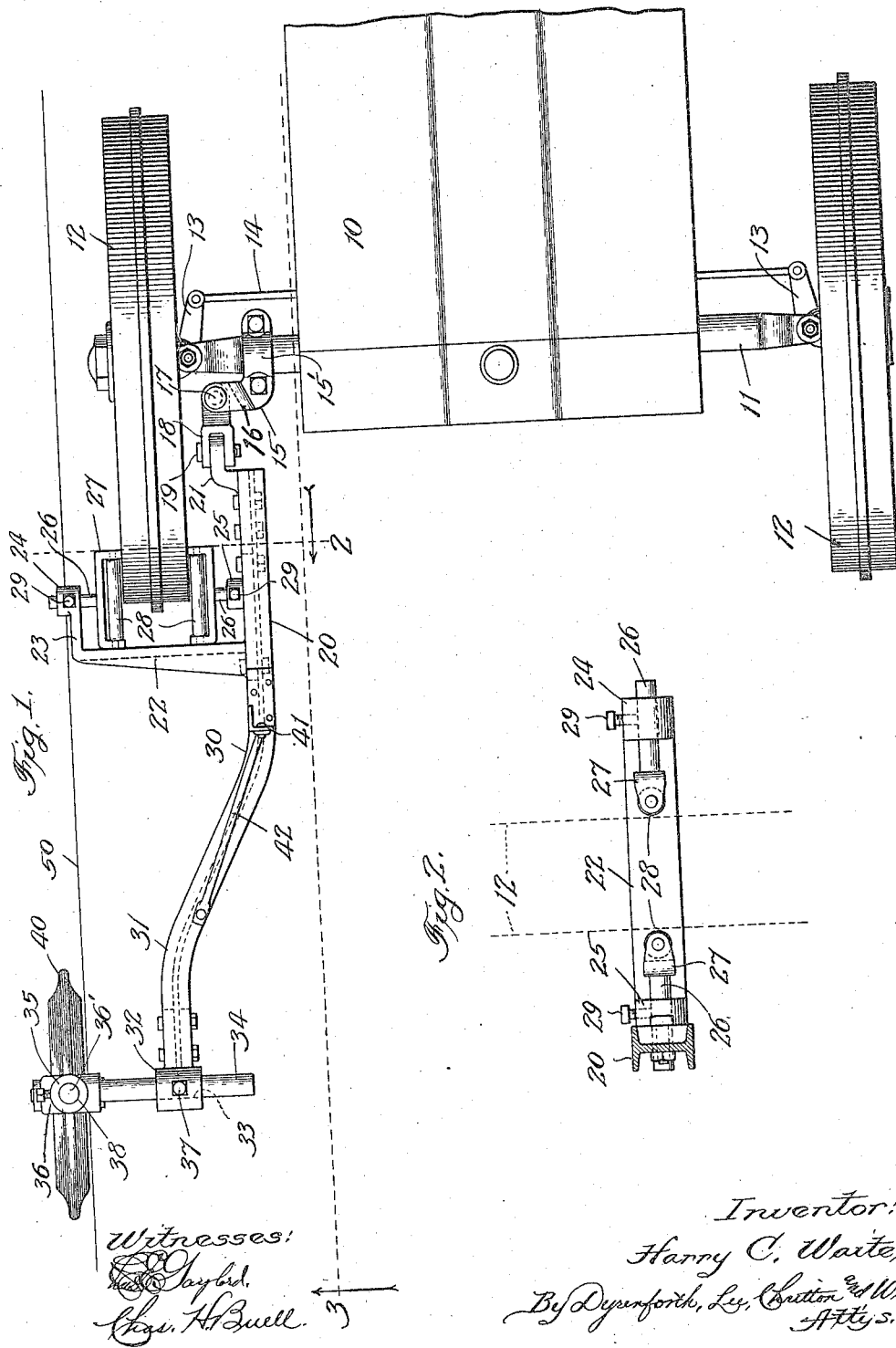
Witnesses:
Inventor:
Harry C. Waite,

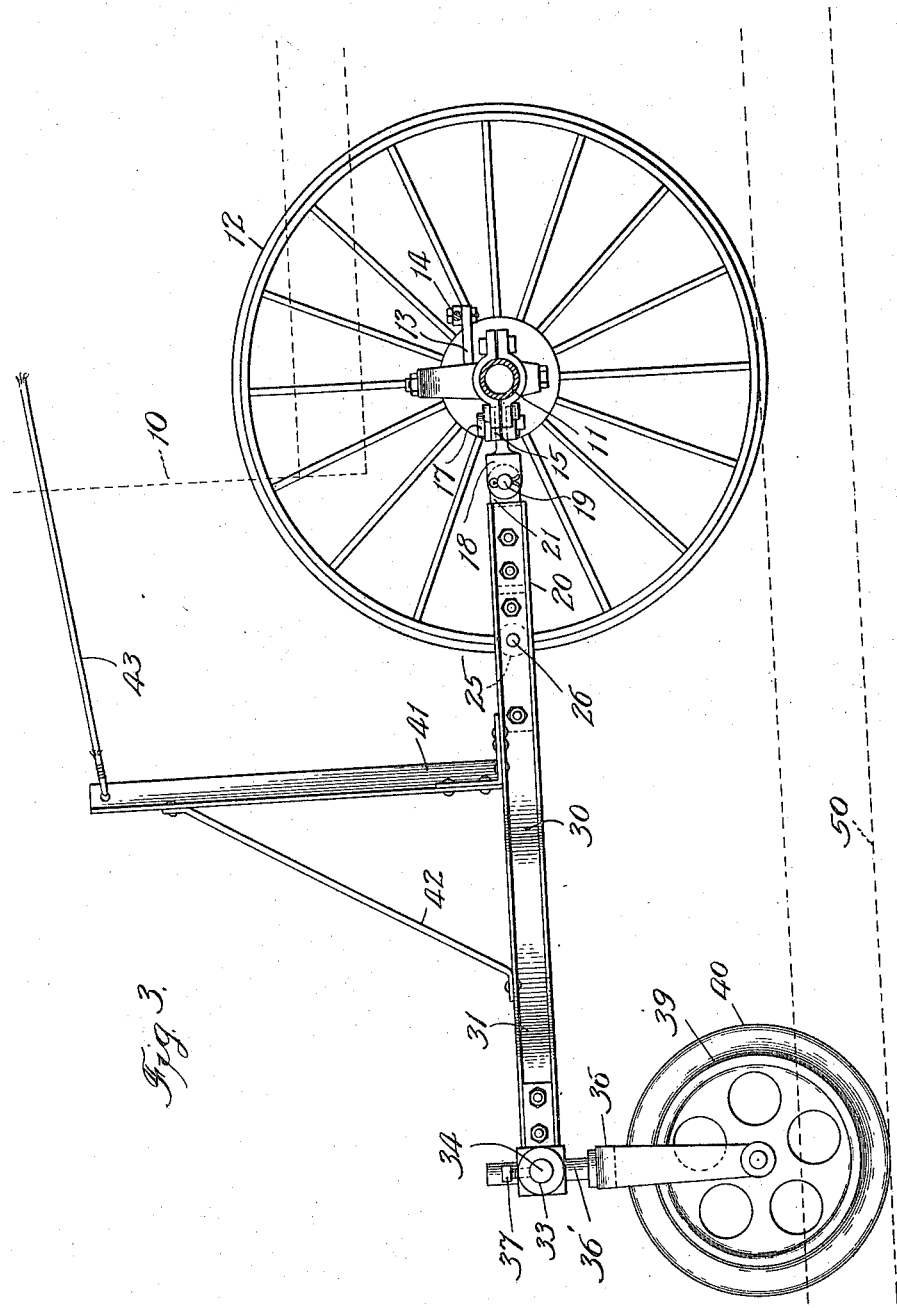

UNITED STATES PATENT OFFICE.

HARRY C. WAITE, OF CHICAGO, ILLINOIS, ASSIGNOR TO WAITE TRACTOR COMPANY, OF CHICAGO, ILLINOIS, A CORPORATION OF ILLINOIS.

TRACTOR STEERING-GEAR.

1,198,088.                Specification of Letters Patent.     Patented Sept. 12, 1916.

Application filed February 23, 1915. Serial No. 9,881.

*To all whom it may concern:*

Be it known that I, HARRY C. WAITE, a citizen of the United States, residing at 12145 Stewart avenue, West Pullman, Chicago, in the county of Cook and State of Illinois, have invented a new and useful Improvement in Tractor Steering-Gears, of which the following is a specification.

My invention relates to improvements in agricultural tractors, and more particularly to an automatic steering device for use on such tractors.

The object of the invention is to provide a simple and efficient form of mechanism adapted to be readily attached to standard tractor constructions employing stud axles, and for the purpose of automatically steering such tractors in the operation of plowing.

For the purpose of making my invention more clear, I will particularly describe one form of apparatus embodying the invention and the manner in which the same is applied and used in connection with a tractor. In this description reference will be had to the accompanying drawings, in which—

Figure 1 is a top plan view of the front axle and front wheels of a tractor, and showing my improved steering mechanism attached thereto. Fig. 2 is a section on the line 2 of Fig. 1, and Fig. 3 is a longitudinal section taken on the line 3 of Fig. 1.

Referring more particularly to the drawings, the numeral 10 designates the front end of a tractor of ordinary construction and supported by a front axle 11 shown as of tubular section (see Fig. 3), and of the automobile or "stud" type, the front wheels 12 being carried in knuckles 13 in a manner well understood in the art. These front wheels will ordinarily be steered by some suitable manual connections operating upon the drag-link 14 by which the two wheels are simultaneously moved.

It is a specific object of my invention to provide an additional automatic means for steering the front wheels to cause the tractor to follow the path of a previously turned furrow in order that the tractor operator may devote his entire attention to the operation of the plow. Such an attachment is shown as consisting of an angular bracket 15 embracing the axle 11 and secured thereto by a cap 15¹, the bracket 15 having a yoke or forked end 16 through which passes a vertical pintle 17 which serves to secure and provide a pivot for a short link 18 which is in turn forked to receive a horizontal pivot-pin 19 upon which the frame 20 of the steering mechanism is mounted, an offset pivot-casting 21 which journals upon the pin 19 being employed to effect the connection. It will be seen that the vertical and horizontal pivots 17, 19 provide a universal coupling between the steering frame 20 and the axle 11. The frame member 20 is preferably of I-section, as shown in Fig. 2, and within the outer channel of the I-section member is bolted a casting 22 which extends outwardly substantially at a right angle to the member 20, and at its outer end carries an arm 23 which extends rearwardly to embrace the front wheel 12.

Mounted within the bores of bosses 24 and 25 carried by the arm 23 and by the base of the casting 22, respectively, are the stems 26 of the roller-forks 27. Each of these forks carries a roller 28 which is adapted to contact with the edge or side of the tread portion of the wheel 12, and to accommodate tractor wheels of varying widths or treads the stems 26 on which the roller-forks are mounted are made adjustable within the bosses 24, 25, set-screws 29 serving to lock the stems 26 in any adjusted position. It will be seen that, due to the independent adjustment permissible with respect to the rollers 28, these rollers may accommodate not only wheels of varying sizes, but may also compensate for different spacings of the wheel with relation to the bracket 15 on which the frame of the steering device is mounted. Forwardly of the casting 22, the frame member 20 is bent outwardly as at 30, and near its front extremity is preferably again bent into alinement with the plane of the wheel, as shown at 31. Bolted to the front end of the frame-member 20 is a casting 32 having a transverse, horizontal bore 33 in which is adjustably mounted a bar 34 which carries at its outer end the head 35 for the steering-wheel fork 36. The bar 34 may be secured in any adjusted position within the horizontal bore 33 by means of a set-screw 37, and the head 35 of the bar is provided with a similar set-screw 38 by which the stem 36¹ of the fork 36 may be vertically adjusted and secured within the vertical bore 38 of this head. The fork 36 carries a relatively small steering wheel or guide wheel 39, the tread portion 40 of which is preferably of V-shape-section, as shown in Fig. 1. By means of the adjustable connection between the bar 34 and the frame member 20, and between the fork 36 and the bar 34, it is possible to adjust both the position and the angle of the guide wheel 39 with relation to the frame member 20.

Intermediate its length the frame-member 20 has mounted thereon a mast 41 suitably guyed, as shown at 42, and carrying at its upper end a cable 43 which extends rearwardly beside the tractor and to a position from which it may be reached by the operator. By means of this cable the frame 20 may be raised, swinging about the horizontal pivot 19, to lift the guide wheel 39 clear of the ground when it is desired to throw the automatic steering gear out of operation.

The operation of my improved automatic steering means is as follows: Assuming that the tractor is being used to pull one or more plows, and that one furrow has already been turned, the tractor will be run parallel with this turned furrow and on the land side thereof, and the cable 43 will then be released to permit the frame 20 to swing downwardly until the wheel 39 rests in the bottom of the previously turned furrow. Thus, in Fig. 1 in the drawings, the numeral 50 represents the line of a previously turned furrow extending parallel to the direction of motion of the tractor, the wheel 39 lying just within this furrow, and the tractor wheel 12 running at some slight distance on the land side of the furrow. If the tractor now be propelled forwardly it will be seen that the wheel 39 will follow the path of the previously turned furrow, preferably being slightly canted so as to hug the land side thereof, thereby holding the frame 20 in the position shown in Fig. 1 of the drawings, and, by means of the engagement of the rollers 28 with the edges of the wheel 12, hold the latter constantly in the position in which it is shown in the drawings, and in which position the tractor will be steered in a line parallel with the previously turned furrow 50. If for any reason the tractor steering-wheels exhibit a tendency to turn in one direction or the other, such tendency may be corrected by angular adjustment or canting of the wheel 39. Thus, if the tractor wheels for any reason tend to turn away from the furrow, the set-screw 38 may be loosened, and the stem $36^1$ of the fork 36 may be turned slightly to cant the guide wheel 39 away from the frame 20. This canting of the wheel 39 will constantly tend to swing the frame 20 toward the furrow line, and thus correct the tendency of the wheel 12 to move away from the furrow line. Similarly, any tendency of the wheel 12 to turn into the furrow may be corrected by angularly adjusting the wheel 39 so as to make it tend to throw the steering frame 20 away from the furrow.

It will be noted that my automatic steering device is not only capable of keeping the tractor parallel with the straight line of a previously turned furrow, but it is also capable of positively steering the tractor that is causing it to take a curved path parallel with any curved furrow which may previously have been plowed, as it will be obvious that if the furrow line 50 curves in one direction or the other, the wheel 39 following the bottom of the furrow will be correspondingly turned to swing the frame 20 about its vertical pivot 17, and to thereby swing the connected front wheels 12 of the tractor to cause them to follow the path of the furrow. Since the vertical pivot 17 of the steering frame 20 is not coaxial with the pivot of the knuckle 13 on which the front wheel is mounted, there will be a slight relative movement between the rollers 28 and the edge of the wheel 12. The rollers are made of sufficient length to permit of this movement. By reason of the full adjustable connections between the frame 20 and the guide wheel 39, the latter may be set in proper position to maintain the tractor at any desired distance away from the furrow line 50, and also to accommodate the steering mechanism to furrows of varying depth. The full universal connection between the frame 20 and the axle 11 permits of the necessary yielding movement between the parts in passing over rough ground and avoids all danger of straining the steering mechanism.

When it is desired to render the automatic steering mechanism inoperative, the cable 43 may be pulled to lift the steering wheel 39 clear of the ground, the frame swinging around the horizontal pivot 19 in this movement. When lifted clear of the ground the automatic steering mechanism, although still remaining in place and ready for instantaneous use, does not embarrass or prevent the ordinary manual steering of the tractor. In such inoperative position, the automatic steering mechanism swings freely about its vertical pivot 17 as the tractor wheels are turned, and in no way interferes with the regular operation of the machine.

The automatic steering mechanism of my invention is capable of being readily applied to almost any standard tractor construction making use of the automobile or stud type of axle, without any changes in or additions to the tractor *per se*. It may be readily applied by any person familiar with the operation of tractors without the use of any special tools or appliances. Its capabilities of adjustment are such as to give the widest range of usefulness, and the facility with which it may be put out of or put into operation merely by the controlling cable 43, are regarded as of the utmost importance.

While I have shown and described in considerable detail one specific embodiment of my invention, I wish it to be understood that such showing and description is illustrative only, and that I do not regard my invention as limited to the particular constructions employed in this embodiment, except insofar as such limitations are included within the terms of the following claims in which it is my intention to claim all novelty inherent in the invention in as broad a manner as is permissible in view of the prior art.

What I claim as new and desire to secure by Letters Patent is:—

1. The combination with a tractor having a stud axle, of an automatic steering mechanism comprising a frame member extending forwardly from and pivoted to the said axle to swing parallel with the wheels thereof, guide means carried by the forwardly extending end of said frame and adapted to ride within a furrow, and members carried by said frame and embracing the rim of one of the wheels of the said axle, whereby the wheels and the said frame are maintained in parallel relationship.

2. The combination with a tractor having a stud axle, of a frame member extending forwardly from and pivoted to swing parallel to the wheels of the said axle, guide means carried by the forwardly extending end of the said frame member and adapted to ride within a furrow, members carried by said frame and embracing the rim of one of the wheels of the said axle for maintaining the said wheels and said frame in parallel relationship, and connections between the said frame and the said axle whereby the guide means may be lifted clear of the ground without disengaging the said frame from the said wheel.

3. In combination, an axle, knuckles carried by the ends of said axle, wheels pivoted in said knuckles, a bracket carried by the said axle adjacent one of the said knuckles, a vertical pivot carried by said bracket, a frame supported by the said vertical pivot and extending outwardly parallel to the plane of the adjacent wheel, a guide-wheel mounted at the outer end of the said frame and adapted to ride within a furrow, and a member carried by said frame intermediate its length and adapted to embrace the adjacent wheel rim, whereby the wheel and the frame are maintained in parallel relation.

4. In combination, an axle, knuckles carried by the end of the said axle, wheels pivoted in said knuckles, a bracket mounted on the said axle adjacent one of the said knuckles, a vertical pivot carried by the said bracket, a link mounted on the vertical pivot, a horizontal pivot carried by the said link, a frame mounted on the said horizontal pivot and extending outwardly therefrom in a direction parallel to the plane of the adjacent wheel, a guide-wheel mounted in the outer end of the said frame and adapted to ride within a furrow when in its lowered position, a member carried by said frame intermediate its length and embracing the adjacent wheel rim, and means for swinging the said frame about its horizontal pivot to lift the said guide-wheel clear of the furrow.

5. In combination, an axle, knuckles at the ends of the axle, wheels pivoted in the said knuckles, a bracket mounted on the axle adjacent one of the knuckles and having an arm extending toward the pivot of the same, a vertical pivot carried by the said arm, a frame carried by the said vertical pivot and extending outwardly in a direction generally parallel to the plane of the adjacent wheel, a guide-wheel carried by the outer end of the frame and adapted to ride within a furrow when in its lowered position, a member carried intermediate the length of the frame and embracing the adjacent wheel-rim, connections between said frame and said axle permitting of the swinging of the former relatively to the latter to lift the guide-wheel clear of the furrow, a mast carried by the frame, and an operating cable secured to the said mast.

6. In combination, an axle, knuckles carried by the ends of said axle, wheels pivoted in the said knuckles, a bracket mounted on the said axle adjacent one of the knuckles and having an arm extending toward the pivot of the adjacent knuckle, a vertical pivot mounted in the said arm, a link journaled on said vertical pivot, a horizontal pivot carried by said link, a frame-member journaled on said horizontal pivot and extending outwardly from the axle in a direction generally parallel to the plane of the adjacent wheel, an arm carried by said frame and embracing the adjacent wheel-rim, rollers carried by the said arm and the said frame and bearing upon the edges of the wheel-rim, and a guide-wheel mounted in the outer end of the said frame and adapted to ride within a furrow.

7. In combination, an axle, knuckles carried by the ends of the said axle, wheels pivoted in the said knuckles, a bracket mounted on the axle and adjacent one of the knuckles thereof, a frame extending outwardly from the said axle and in a direction generally parallel to the planes of the wheels thereof, a universal joint connecting said frame and axle, an arm mounted on said frame intermediate its length and extending outwardly to embrace the adjacent wheel-rim, bearing rollers carried by said arm and said frame and bearing upon the edges of the wheel-rim, and a guide-wheel carried by the outer end of the said frame and adapted to ride within a furrow.

8. In combination, an axle, knuckles carried by the ends of said axle, wheels pivoted in said knuckles, a bracket carried by the axle adjacent one of the knuckles thereof, a frame-member extending outwardly from the axle, and lying generally parallel to the planes of the wheels thereof, a universal joint-connection between the said frame-member and the said axle, means carried by said frame-member intermediate its length for embracing the adjacent wheel-rim to maintain the wheel and the frame in parallel relation, a guide-wheel carried by the outer end of the frame, and means for adjusting said guide-wheel laterally with relation to the frame-member.

9. In combination, an axle, knuckles carried by the ends of said axle, wheels pivoted within the said knuckles, a bracket carried by the axle, a universal coupling carried by the bracket, a frame-member extending outwardly from the axle, and carried by the said coupling, an arm mounted on the said frame-member intermediate its length and embracing the adjacent wheel-rim, rollers carried by said arm and frame-member and adapted to bear against the opposite edges of the wheel-rim, the said rollers being adjustable toward and away from the wheel-rim, and a guide-wheel carried by the outer end of the frame-member and mounted for lateral, vertical and angular adjustment with relation thereto.

10. In combination, an axle, knuckles carried by the ends of the axle, a bracket carried by the axle adjacent one of the said knuckles, a frame-member extending outwardly from the said axle and in a direction generally parallel to the planes of the wheels thereof, a link connecting said frame-member and said bracket, said link having a vertical pivot connected with one of said parts, and a horizontal pivot connected with the other of said parts, an arm mounted on the said frame intermediate its length and embracing the adjacent wheel-rim, opposed rollers carried by said arm and said frame, said rollers being mounted for adjustment toward and away from each other and adapted to bear against the opposite edges of the adjacent wheel-rim, a guide-wheel adapted to ride within a furrow, a fork in which said guide-wheel is mounted, and vertically, angularly and laterally adjustable connections between said fork and said frame-member.

11. In combination, an axle, knuckles carried by the ends of the axle, a bracket carried by the axle adjacent one of the said knuckles, a frame-member extending outwardly from the said axle and in a direction generally parallel to the planes of the wheels thereof, a link connecting said frame-member and said bracket, said link having a vertical pivot connected with one of said parts, and a horizontal pivot connected with the other of said parts, an arm mounted on the said frame intermediate its length and embracing the adjacent wheel-rim, opposed rollers carried by said arm and said frame, said rollers being mounted for adjustment toward and away from each other and adapted to bear against the opposite edges of the adjacent wheel-rim, a guide-wheel adapted to ride within a furrow, a fork in which said steering-wheel is mounted, a mast carried by the said frame, and a tension member connected with said mast, whereby the frame may be swung about its horizontal pivot to lift the said guide-wheel from engagement with the furrow.

HARRY C. WAITE.

In presence of—
D. C. THORSEN,
O. C. AVISUS.

Copies of this patent may be obtained for five cents each, by addressing the "Commissioner of Patents, Washington, D. C."